Patented Dec. 29, 1925.

1,567,312

UNITED STATES PATENT OFFICE.

RUDOLF WIETZEL, OF LUDWIGSHAFEN-ON-THE-RHINE, GERMANY, ASSIGNOR TO BADISCHE ANILIN- & SODA-FABRIK, OF LUDWIGSHAFEN-ON-THE-RHINE, GERMANY, A CORPORATION OF GERMANY.

MANUFACTURE OF FORMAMIDE.

No Drawing. Application filed May 20, 1925. Serial No. 31,703.

*To all whom it may concern:*

Be it known that I, RUDOLF WIETZEL, citizen of the German Empire, residing at Ludwigshafen-on-the-Rhine, Germany, have invented new and useful Improvements in the Manufacture of Formamide, of which the following is a specification.

When ammonia is allowed to act on alkyl formates, formamide is produced very slowly.

I have found that by employing ammonia under increased pressure, the reaction is caused to proceed very quickly and completely. A few atmospheres pressure are sufficient to bring about this most desirable improvement. Gaseous ammonia may be employed as well as liquid ammonia. With liquid ammonia an excessive rise of temperature is avoided by the absorption of the latent heat of evaporation.

When, for example, ammonia is caused to act at a pressure of 8 atmospheres (or about 60 pounds) on methyl formate contained in a steel cylinder, the decomposition is complete after a few minutes. Heat is generated which generally suffices for evaporating the methanol formed according to the equation $$HCOOCH_3 + NH_3 = HCONH_2 + CH_3OH$$

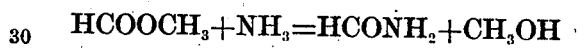

when the pressure is released. The residue consists of practically pure formamide which may at once serve as a solvent or for carrying out other decompositions.

Other alkyl formates may be used, but the invention is carried out with particular advantage in the case of methyl formate, as the latter can be readily obtained by the action of carbon monoxide on methanol with the aid of catalysts, or by the catalytic hydrogenation of oxides of carbon to methanol when methyl formate is obtained as a by-product.

The process in accordance with this invention allows of a continuous working. To this end a vessel capable of withstanding the pressure and well isolated is employed, and while methyl formate and ammonia are introduced under pressure, the formamide formed is withdrawn continuously in a liquid condition by means of an expansion valve while part or all of the methanol evaporates after its passage through the valve.

In order to avoid undesirable sudden rise of temperature it is advisable gently to heat the alkyl formate prior to adding ammonia, say to 40–70°, as with lower temperatures, say 10°, the ammonia would act on the alkyl formate first to a small extent only, whereupon reaction would spontaneously start with dangerous development of heat and pressure. During introduction of ammonia cooling should be applied in order to prevent the temperature from rising too high, say above about 100° centigrade.

It is also possible and in many cases advantageous to produce the alkyl formate required, for example methyl formate, by the interaction of carbon monoxide and an alcohol in the same vessel where the production of formamide is effected and in these cases carbon monoxide and ammonia are caused to act, for example on methanol, either one after the other or even simultaneously. The presence of alkali metal or alcoholates thereof acts in a strongly accelerating way. In such cases all of the methanol employed is to be found again after the reaction so that when considered from the final result, the alcohol acts simply as a conveying or reaction medium for carbon monoxide and ammonia. As a consequence of this property, carbon monoxide and ammonia can be employed in far greater quantities than those calculated in accordance with the molecular weights, and a multiple of formamide compared to the alcohol employed is accordingly obtained.

For example, when carbon monoxide and ammonia, at a total pressure of 150 atmospheres, are caused to act on 20 cubic centimetres of methanol containing 3 grams of metallic sodium dissolved therein, at 50 degrees centigrade, about 100 grams of formamide and 20 cubic centimetres of unaltered methanol are obtained.

I claim:

1. The process of manufacturing formamide which consists in acting on alkyl formate with ammonia at a pressure exceeding atmospheric pressure.

2. The process of manufacturing formamide which consists in acting on alkyl formate with liquefied ammonia under pressure.

3. The process of manufacturing formamide which consists in acting an alkyl formate with liquefied ammonia under pressure and at a temperature of between about 40 and 100 degrees centigrade.

4. The process of manufacturing formamide which consists in acting on alkyl formate with ammonia at a pressure exceeding atmospheric pressure while avoiding loss of heat and evaporating the alcohol by the heat of the reaction mass after releasing the pressure.

5. The process of manufacturing formamide which consists in acting on an aliphatic alcohol with carbon monoxid and ammonia, at a higher pressure than atmospheric pressure.

6. The process of manufacturing formamide which consists in acting on methanol with carbon monoxid and ammonia in the presence of metal alcoholate, at a pressure exceeding atmospheric pressure.

In testimony whereof I have hereunto set my hand.

RUDOLF WIETZEL.